United States Patent Office 2,917,413
Patented Dec. 15, 1959

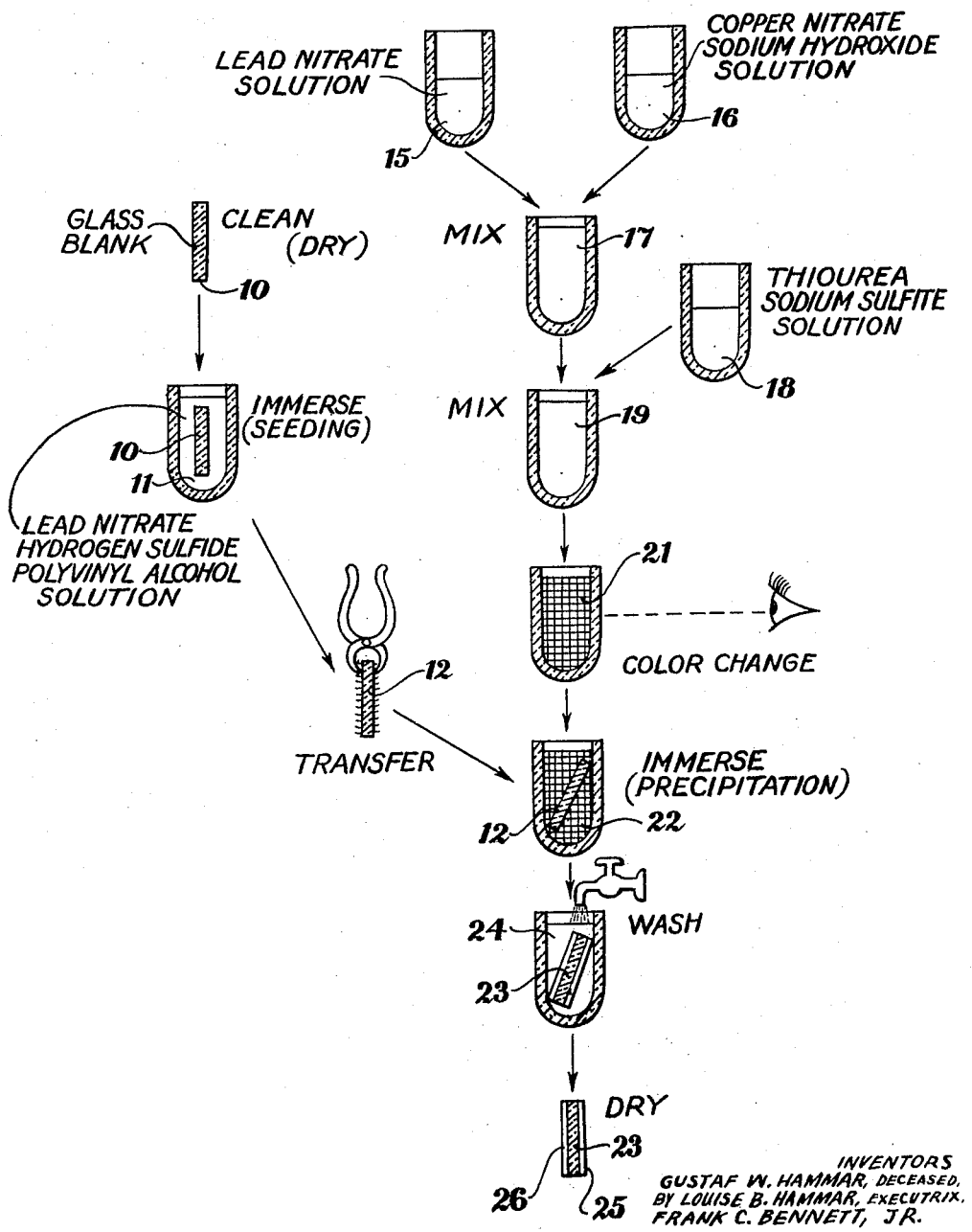

2,917,413

HIGHLY SENSITIVE LEAD SULFIDE SURFACES AND THE METHOD OF MANUFACTURE

Gustaf W. Hammar, deceased, late of Rochester, N.Y., by Louise B. Hammar, executrix, and Frank C. Bennett, Jr., Rochester, N.Y., assignors to Eastman Kodak Company, Rochester, N.Y., a corporation of New Jersey Application February 16, 1956, Serial No. 567,046

14 Claims. (Cl. 117—211)

This application is a continuation-in-part of our application Serial No. 276,798, filed March 15, 1952, now abandoned.

This invention relates to photoconductive cells, and particularly to the manufacture of infrared sensitive lead sulfide photoconductive cells.

The photosensitivity of lead sulfide has been known for many years, and crystalline lead sulfide surfaces have been prepared by various methods which can be divided into two groups, generally referred to as chemical deposition and vacuum evaporation, respectively. Both types of such cells have been used for the past several years. However, compared to cells according to the present invention, all of these prior cells lack uniformity and have a relatively low sensitivity and are limited in their application to systems which can tolerate such low sensitivity.

The object of the present invention is to provide lead sulfide cells whose sensitivities are uniform and are uniformly increased compared to the prior art by a factor of at least 2, usually by a factor of 10 to 100 or even higher. These high sensitivities are obtained consistently and are even higher than some of the freak cells obtained occasionally and accidently by previous processes. Compared to commercially available cells, i.e., compared to anything produced consistently before, the present cells are over 100 times as sensitive.

The process employed in the present invention is of the chemical type, that is, of the type in which lead sulfide is precipitated onto a seeded glass surface by the addition of thiourea to a highly alkaline solution of a lead salt.

The present invention particularly involves a modification of the alkaline lead salt solution or the thiourea solution either before or at the time they are combined. It works particularly well with the delayed immersion effect discovered by Courtney Q. Glassey and described in application Serial No. 567,045, filed concurrently herewith, which is a continuation-in-part of application Serial No. 276,799, filed March 15, 1952, now abandoned. As pointed out by Glassey, when thiourea is added to the alkaline lead salt solution, the solution is an automatic seeding one for a minute or so (depending on temperature, concentrations, etc.). If one is willing to forego the advantages of the Glassey invention, the present invention can utilize this automatic seeding effect.

However, the present invention finds its greatest use and effect when applied to the Glassey process. This is because the Glassey effect depends on the rate of precipitation after the period of automatic seeding has passed and the present invention provides a peculiary critical control of the rate of precipitation. Furthermore, since the Glassey process avoids the period of automatic seeding, the Glassey process generally and hence the preferred form of the present process both require the use of a preseeded surface.

The present invention works with any type of preseeding such as the mechanical or chemical deposition or thermal evaporation of a seed coat of a metal sulfide or a metal oxide. Alternatively, when a glass base is used, mere dipping in a cationic wetting agent will produce a seed coat. In general, none of these types of preseeding affect the value of the final sensitivity of the cell appreciably, but they do insure that the process will work and that the coatings will be uniform. They provide the centers for crystallization and the sensitivity, in general, is the same whichever form of seeding is used. However, the preferred embodiment of the present invention employs preseeding in colloidal lead sulfide as described by Meyer Sugarman, Jr., in his application Serial No. 567,047, filed concurrently herewith, which is a continuation-in-part of application Serial No. 276,800, filed March 15, 1952, now abandoned. The Sugarman type of seeding actually does affect the final sensitivity by a factor of 2 or 3, providing the other types of seeding, i.e., other centers for crystallization, are kept to a minimum. It is believed that the crystals which form on this preferred type of seed are of a somewhat different form which in some way accounts for the increased sensitivity.

The primary feature of the present invention which provides an improvement factor of about 3 (i.e., 300%) is the presence of a copper salt in the coating solution. It was hitherto thought that copper acted as a poison to lead sulfide cells, and this is true if the copper is present in too large a proportion. The proportion of copper turns out to be quite critical. If it is below a certain value, the precipitation and crystallization process proceeds slowly and the change of color effectively stops; the resultant lead sulfide cells are then of much lower sensitivity. Similarly, if the concentration of copper salt is too high, it is quite impossible to control the rate of the process or to get as useful a product.

According to the present invention, the rate of precipitation of the lead sulfide and hence the crystalline form of the lead sulfide coating is controlled by having a copper salt in the precipitating solution. It is conceivable that some copper sulfide is also deposited with the lead sulfide but, if so, the amount of copper sulfide is extremely small. This added copper is not detectable in ordinary spectroscopic tests of the final coating. Accordingly, the unique form of lead sulfide coating according to the present invention is best described in terms of the method of coating. Specifically, the precipitated layer comprises lead sulfide precipitated from a highly alkaline solution of a copper salt and a lead salt in a ratio of molar concentrations between .0008 and .010 by the addition of a solution of thiourea. In some embodiments the sensitivity is improved if the addition of thiourea is in the presence of an alkali sulfite. The copper may be in either the lead solution or the thiourea, or both, before the solutions are combined provided the ratio of total copper to lead is within the range just specified.

When lead sulfide is precipitated in the above-described manner, it tends to be heavier than the solution and, hence, it tends to sink to the bottom of the container. We have found that the crystallized lead sulfide surfaces are more sensitive if they are allowed to form in a direction unaided by gravity. If a glass plate, seeded on both sides, is placed in the precipitating solution with one side facing up and the other side facing down, the upper surface receives both a gravity aided deposit and the crystallization which takes place in the seed itself whereas the lower surface of the glass plate receives only the crystallization which takes place at the seed itself, and this crystallization is not interferred with by any of the slowly settling lead sulfide. It turns out that the lower surface is perhaps 10 times as sensitive as the upper surface in this example. Actually, the glass plate does not have to be horizontal, and vertical surfaces do receive a fairly sensitive coat, but to be on the safe side, the plate is generally tilted so that one surface is sure to receive its coating unaided by gravity. Also, to prevent any unnecessary interference with the crystallization agitation of the solution during coating is kept at a minimum.

In a preferred form of the present invention, a highly alkaline solution of copper nitrate is made up of 120 ml. of water, 120 ml. of a .0013 M copper nitrate solution (i.e., totaling 240 ml. of a .00057 M solution) and 100 ml. of sodium hydroxide solution containing 140 grams of sodium hydroxide per liter. To this alkaline solution of cupric ion is added 100 ml. of lead nitrate solution containing 100 grams of lead nitrate per liter and the combined solutions are brought to a temperature of 23° C. Due to the amphoteric nature of lead this gives a solution of plumbite ion. A third aqueous solution containing 10 grams of thiourea (preferably recrystallized) and 1 gram of anhydrous sodium sulfite in 100 ml. is also brought to 23° C. The lead alkali mixture is a light blue due to the cupric ion. The thiourea solution is added to the lead alkali mixture which then turns amber and, as time progresses, this color becomes darker. In about 8 minutes it becomes a deep gold color. The gold then turns to brown, and finally to black. Just before the solution is entirely black, i.e., when the optical density per centimeter thickness reaches about .5 say, which occurs some 30 seconds after a uniform brown and around 10 to 15 minutes after the start of the process at 23° C., the seeded glass blanks are immersed and the lead and copper sulfides precipitated onto the seeded surface, the gross precipitate which is settling, and to the coating on the walls of the container. Optical density per centimeter thickness does not include the coating on the walls. Density readings, when taken, are made promptly through clean densitometer windows or cells. However, in practice precise numerical values are not needed. The numerical values are mentioned here only because terminology is simplified thereby. In practice it is quite easy visually to select a time somewhere in the range starting at some moment when the solution becomes quite dark and continuing to some moment several minutes after the solution first becomes quite black. A time anywhere in this broad range gives the optimum effect discovered by Glassey and enhanced by combination with the present invention. An optical density of about .5 per centimeter corresponds to start of this range but this is unimportant except for the sake of definition, since it is always past this point by the time the operator finally inserts the blanks.

The blanks should remain in the solution for a period of time between 10 and 100 minutes, preferably about 40 to 50 minutes. The cells are then rinsed with cool tap water. The surface of the glass plate which has faced upward or partially upward in the precipitating solution will be noted to have a dark sooty deposit thereon and this surface will be found to be relatively insensitive, whereas the other surface which has faced at least partially downward will have a uniform gray appearance. Any loose crystals adhering to the sensitive surface are usually removed by careful swabbing with a camel's hair brush. The surface may be dried either with a blotter or by being allowed to stand in air. The sensitive surface is then ready to receive electrical contacts and to be used as a photoconductive cell. It does not have to be placed in a vacuum.

Of course, the rate of reaction in each of the steps described above depends on temperature. The temperature should be between 5° C. and 40° C. and much shorter times are used at the higher temperaturse, whereas longer times are used at lower temperatures. The process works quite well at room temperature and, hence, it is for this reason 23° C. was selected in the example given above.

In the precipitating bath, the copper concentration should be between $5 \times 10^{-5}$ and $5 \times 10^{-4}$ molar. In the above example it will be found that if the copper concentration is less than $5 \times 10^{-5}$ the solution never reaches the dark brown stage and the resulting cells are relatively insensitive. If the concentration is above $5 \times 10^{-4}$ molar at 23° C., the process is far too fast and quite uncontrollable. At lower temperatures, this upper limit on the concentration is slightly higher but not very much. The copper may be in either the thiourea or in the lead solution before the two are combined provided the molar concentration in the ultimate precipitating bath is in the range specified. Since it is customary to make up fresh solutions of thiourea each day, it is more convenient to have the copper and lead in a single stock solution but obviously this advantage is only a slight one. The copper may be in the form of a solution of any water soluble cupric salt such as cupric nitrate, cupric acetate, cupric chloride, cupric chlorate or cupric perchlorate. The salt may even be a complex one provided the other metal is not objectionable for some reason not related to the action of the copper.

The lead concentration with reference to the complete precipitating bath is between .05 and .06 molar, which is obviously a critical range. It depends somewhat on the hydroxide concentration. The sodium hydroxide should be between .55 and .75 molar, the higher concentrations being used with the higher concentrations of lead. The lead is introduced in the form of a water soluble salt, preferably lead nitrate, lead acetate, lead chlorate or lead perchlorate.

The preferred time to add the seeded glass blank to the precipitating solution is within a few minutes either way of when the color of the solution reaches a dark brown, or almost black, color.

Useful cells are obtained when the cell is added anytime within a range between 5 minutes early and 15 minutes late with respect to the "just black" moment, specifically at 23° C. In other terms, if the temperature is between 5° C. and 40° C. preferably between 20° C. and 30° C., one should wait for a period between 5 and 30 minutes, from the time the thiourea is added to the lead alkali solution and should then immerse the seeded surface in the precipitating solution for a period of time between 10 and 100 minutes.

The thiourea concentration in the precipitating bath is preferably between .15 and .3 molar. Depending on the copper concentration, additional sensitivity is sometimes obtained by the addition of an alkali sulfite such as the sodium sulfite mentioned in the example given above. That is, the sulfite concentration should be between 0 and .05 molar. It is more useful at lower copper concentrations and does not seem to be necessary when the copper concentration is $5 \times 10^{-4}$ molar. It will be realized that since the reaction time in any chemical process depends on temperature, factors given above will also vary with temperature at least within the ranges specified. In fact, a change of 4 or 5° C. apparently will change the reaction rate by a factor of 2.

The accompanying drawing is a flow chart illustrating schematically a process for the manufacture of lead sulfide cells according to a preferred embodiment of the invention.

The essential novelty of the present invention appears in the steps illustrated near the top of the diagram. The method by which the glass blank is seeded prior to precipitation is not a critical part of the present invention, but the particular form illustrated is the preferred one as described in the copending Sugarman case referred to above. In the diagram, which for convenience illustrates the various solutions as being in test tubes, a sodium hydroxide solution is made up in advance and replenished daily as used. When added to a copper nitrate solution in the ratio of 240 ml. of a .00057 M copper nitrate solution and 100 ml. of sodium hydroxide solution containing 140 grams of sodium hydroxide per liter it constitutes solution 16. To this alkaline solution 16 is added 100 ml. of stock lead nitrate solution 15 containing 100 grams per liter. The mixture 17 is held at 23° C. in the specific example given, but the process operates equally well at other temperatures between 5° C. and 40° C. provided the reaction times are selected in accordance with the temperature. The present example is given for a temperature of 23° C. which, of course, is easy to maintain. A thiourea sodium sulfite solution 18 is made up containing ten grams of recrystallized thiourea and one gram of anhydrous sodium sulfite per hundred ml. This is poured into the lead alkali solution 17 to form the mixture 19 which, at first, is amber but which within a few minutes darkens to gold, then brown, and just before it turns almost black, as indicated at 21 in the diagram, a seeded plate 12 is immersed in the precipitating solution. Useful cells are obtained in coating times of 10 to 100 minutes. The copper nitrate may be in the thiourea solution 18 rather than in the sodium hydroxide solution 16. At the moment solutions 17 and 18 are mixed the molar concentrations in the solution 19 are approximately as follows: lead .055 M, copper .00025 M, sodium hydroxide .65 M, thiourea .24 M, and sodium sulfite .015 M, which values are all within the preferred ranges mentioned previously.

As shown in the diagram, a glass blank 10 is first cleaned thoroughly, for example by treatment with sodium dichromate and sulfuric acid, followed by rinsing with distilled water and preferably then dried. The blank 10 is then immersed in a seeding solution containing a lead salt, hydrogen sulfide and a stabilizing agent for stabilizing the lead sulfide in a colloidal state. The preferred agent is polyvinyl alcohol which also acts as a wetting agent. The clean plate 10 remains in the colloidal seeding sol 11 for a period of two hours or more, after which the seeded plate 12 is transferred at the proper time to the precipitation solution 22.

The seeded plate rests at an angle in the precipitating solution so that at least one surface receives precipitated crystals thereon in a direction unaided by gravity. That is, the upper surface receives direct crystallization plus some crystals deposited by the settling of the precipitate in the solution, whereas the under surface of the plate 12 receives only those crystals which crystallize out directly onto a surface. Since the gross precipitate which settles out interferes with the formation of surfaces of the highest sensitivity, the under surface becomes the more sensitive one and, to be sure of uniformly high sensitivity it is desirable not to agitate or disturb the solution during the coating action. It is usually more convenient to wash the coated plate 23 in the test tube or vial rather than lift it from the test tube after the completion of the coating operation. This is illustrated in the diagram by a tap from which water 24 is flowing into the test tube for washing the plate 23. The plate is then dried and ready for use. The surface 25, which was the under surface during the precipitation, is the more sensitive one. The other surface which faced more or less upward during precipitation receives a layer 26 which is less sensitive due to the physical action of the gross precipitate while the crystals are forming. Any loosely adhering crystals on the sensitive side 25 are gently removed by careful swabbing by a camel's hair brush before the plate is dried. The sooty coating on the side 26 may be removed by swabbing with cotton dampened with hydrochloric acid. The resulting sensitive surface is quite durable to reasonable temperature changes and to a reasonable amount of handling, but, of course, small scratches or the like due to mishandling result in a photoconductive cell likely to produce excessive noise in any photoelectric system in which it is used. As pointed out previously, the ratio of lead salt to sodium hydroxide must be held within certain limits, but this is not the novel feature of the present invention. The critical features which are novel include, as the most important one, the ratio of copper to lead in the precipitating solution and its effect on the ultimate photosensitive surface. The timing of the precipitation, for example, in terms of the color change of the thiourea lead alkali mixture and, in any case, with reference to the time at which the thiourea is added to the lead alkali mixture, is definitely important if the maximum sensitivity is to be obtained. Similarly, it has been found that the increased sensitivity due to sodium sulfite cooperates particularly well with the copper-lead sulfide feature which constitutes the main point of the present invention. Also, it has been found that the Sugarman effect can be utilized along with the present invention. That is, the Sugarman type of seeding will increase the sensitivity of any lead sulfide cell by a certain factor. It might be expected that this advantage could not be gained if the sensitivity were increased any way by the presence of copper according to the present invention. However, this is not the case and it has been found that the advantages of the Sugarman invention and the advantages of the present copper effect can both be gained simultaneously and, hence, the preferred embodiment of the present invention employs glass plates seeded according to the Sugarman system. The difference between effects which can be realized simultaneously and those which are alternative to each other is emphasized by the effect of sodium sulfite in the thiourea as discussed above. Under certain conditions this latter effect is merely alternative, and under others it is an advantage to use both the copper effect and the sodium sulfite effect. Specifically, when the copper concentration is pushed toward the maximum end of the range, the sodium sulfite has less effect, whereas it is particularly useful when the copper concentration is held within the preferred range as in the specific example given.

The minute copper content according to the present invention thus apparently has two effects. As far as the final cell is concerned, it is associated with the increased sensitivity and particularly with the uniformity of sensitivity of the lead sulfide crystals, although it is doubtful that any of the copper itself is present in the sensitive layer. It is believed that the lead sulfide has a preferred uniform crystalline form because of the copper. Secondly, the copper provides both the rapidity of precipitation and the control of the rapidity or rate so as to enhance the effect of delayed immersion as discussed above. In fact it appears that the combination of this invention with those of Glassey and Sugarman also discussed above is "pushing the ceiling" of lead sulfide sensitivity whereas prior cells in general had less than 1% of this ceiling, or optimum obtainable sensitivity.

While we have discussed the preferred ranges for each characteristic of our invention, it is to be understood that the invention is of the scope of the following claims.

We claim:

1. The method of forming a photosensitive layer of lead sulfide crystals which comprises precipitating the crystals onto a solid support by adding a solution of thiourea to an alkaline solution of a lead salt, one of the solutions containing a copper salt, the lead salt being a water soluble salt selected from the group consisting of lead nitrate, lead acetate, lead chlorate and lead perchlorate, the copper salt being a water soluble salt selected from the group consisting of cupric nitrate, cupric acetate, cupric chloride and cupric chlorate and cupric perchlorate, the concentrations in the solutions when first combined being as follows: lead between .05 and .06 molar, copper between $5 \times 10^{-5}$ and $5 \times 10^{-4}$ molar, and hydroxide between .55 and .75 molar, immersing the solid support in the combined solutions to receive precipitated crystals of lead sulfide and then drying the surface.

2. The method according to claim 1 in which the immersing is for a period of time between 10 and 100 minutes at a temperature between 5° C. and 40° C.

3. The method according to claim 1 in which an alkali sulfite is added to one of the solutions before they are combined with the concentration of sulfite in the combined solutions less than .05 molar.

4. The method according to claim 1 in which the concentrations of thiourea in the combined solutions is between .15 and .3 molar.

5. The method according to claim 1 in which the immersing is delayed between 5 and 30 minutes from the time the solutions are combined.

6. The method according to claim 1 in which the immersing is delayed at least until the combined solutions have turned almost black with an optical density greater than .5 per centimeter thickness.

7. The method of forming a photosensitive layer of lead sulfide crystals which comprises precipitating the crystals onto a seeded glass support by adding a solution of thiourea to an alkaline solution of a lead salt and a copper salt, the lead salt being a water soluble salt selected from the group consisting of lead nitrate, lead acetate, lead chlorate and lead perchlorate, the copper salt being a water soluble salt selected from the group consisting of cupric nitrate, cupric acetate, cupric chloride, cupric chlorate and cupric perchlorate, the concentrations in the solutions when first combined being as follows: lead between .05 and .06 molar, copper between $5 \times 10^{-5}$ and $5 \times 10^{-4}$ molar, and hydroxide between .55 and .75 molar, immersing the seeded glass support in the combined solutions to receive precipitated crystals of lead sulfide and then drying the surface.

8. The method according to claim 7 in which the seeded glass support is made by seeding it slowly in a stabilized colloidal solution of lead sulfide.

9. The method according to claim 7 in which the immersing is for a period of time between 10 and 100 minutes at a temperature between 5° C. and 40° C.

10. The method according to claim 7 in which an alkali sulfite is added to one of the solutions before they are combined with the concentrations of sulfite in the combined solutions less than .05 molar.

11. The method according to claim 7 in which the concentrations of thiourea in the combined solutions is between .15 and .3 molar.

12. The method according to claim 7 in which the immersing is delayed between 5 and 30 minutes from the time the solutions are combined.

13. The method according to claim 7 in which the immersing is delayed at least until the combined solutions have turned almost black with an optical density greater than .5 per centimeter thickness.

14. The method of forming a photosensitive layer of lead sulfide crystals which comprises seeding a clean glass surface slowly in a stabilized colloidal solution of lead sulfide, adding a solution of thiourea to an alkaline solution of lead nitrate and cupric nitrate with a concentration of lead between .05 and .06 molar, a concentration of copper between $5 \times 10^{-5}$ and $5 \times 10^{-4}$ molar and a concentration of hydroxide between .55 and .75 molar and immersing the seeded glass surface in the combined solutions to receive precipitated crystals of lead sulfide and then drying the surface.

References Cited in the file of this patent

Mellor: Comprehensive Treatise on Inorganic and Theoretical Chemistry, vol. 7, page 783, 1927.